United States Patent [19]

Khalid et al.

[11] Patent Number: 5,175,761
[45] Date of Patent: Dec. 29, 1992

[54] CALL TRANSFERS BY VOICE MESSAGING SYSTEM (VMS) INTEGRATED TO A PRIVATE BRANCH EXCHANGE

[75] Inventors: Zafar M. Khalid; Rachel Ramsay; Joseph F. Khouri, all of San Jose, Calif.

[73] Assignee: ROLM Systems, Santa Clara, Calif.

[21] Appl. No.: 793,777

[22] Filed: Nov. 18, 1991

[51] Int. Cl.⁵ .................. H04M 1/66; H04M 3/50; H04M 3/58

[52] U.S. Cl. .................. 379/89; 379/198; 379/231; 379/232; 379/233; 379/67

[58] Field of Search .................. 379/67, 198, 231, 232, 379/233

[56] References Cited

U.S. PATENT DOCUMENTS

| | | | |
|---|---|---|---|
| 4,783,796 | 11/1988 | Ladd | 379/67 |
| 4,926,462 | 5/1990 | Ladd et al. | 379/198 |
| 5,083,308 | 1/1992 | Gaulke et al. | 379/201 |

OTHER PUBLICATIONS

"A Practical Guide to Voice Mail" by Martin P. Parker, Osborne McGraw-Hill, 1987 at pp. 2-20 and 198-199.

"A Voice Message System" by D. Cohen in Computer Message Systems, edited by RP Uhlig, Proceeding of the IFIP TC-6 International Symposium on Computer Message Systems, Ottawa, Canada, Apr. 6-8 1981, North Holland Publishing Co., at pp. 17-28.

"An Experimental Voice-Message System Controlled by Word Recognition" by P. Mermelstein et al. in Computer Message Systems, Edited by R. P. Uhlig, Proceeding of the IFIP TC-6 International Symposium On Computer Message Systems, Ottawa, Canada, Apr. 6-8, 1981, North Holland Publishing at 29-34.

"Voice Mail and Competing Services" by Dr. I. Gitman in Computer Message Systems, edited by R. P. Uhlig, Proceeding of the IFIP TC-6 International Symposium on Computer Message Systems, Washington, D.C., Sep. 5-7 1985, North Holland Publishing Co., at pp. 405-410.

Primary Examiner—James L. Dwyer
Assistant Examiner—Fan Tsang

[57] ABSTRACT

Method and apparatus are disclosed for initiating multiple call transfers from a Voice Mail System ("VMS") to telephone extensions on a Private Branch Exchange ("PBX") integrated with the VMS. A plurality of first lines between the PBX and the VMS provide voice communication between callers and the VMS via the PBX. The VMS includes an applications processor which is integrated (coupled) to the PBX via an integration link. The applications processor determines if at least one of a plurality of second lines in a hunt group are free, and transmits a command to the PBX to effect a call transfer to an extension on the PBX if at least one second line is found free. If no second line is found free, the applications processor places the transfer request in a queue. The plurality of second lines in the hunt group are searched in response to the PBX receiving the special command over the integration link to find a free second line. This second line is used to connect the applications processor to the PBX to complete the call transfer to a particular extension. Once a caller requesting a transfer is connected to the desired extension, the second line is released for use on another call transfer request or a queued transfer request. Concurrently, other call transfers at different stages of transfer are capable of being handled via other ones of the second lines.

11 Claims, 2 Drawing Sheets

CALL TRANSFERS BY VOICE MESSAGING SYSTEM (VMS) INTEGRATED TO A PRIVATE BRANCH EXCHANGE

TECHNICAL FIELD OF THE INVENTION

The present invention relates to a method for initiating multiple, substantially concurrent, transfers from a Voice Messaging System ("VMS") to various telephone extensions on a Private Branch Exchange ("PBX") which is integrated with the VMS using an integration link.

BACKGROUND OF THE INVENTION

In recent years communication systems have added many new services for consumer use. For example, a Voice Messaging System ("VMS") is used to provide a voice messaging service to a called party when the called party is unavailable. More particularly, the service of leaving a voice message for the called party is in widespread use in the case of a non-completed telephone call (e.g., where the called party is either busy or otherwise unavailable). Voice messages may in fact be more efficient than telephone conversations where participation of the two parties to a call is not required to transfer information. Voice messaging can be considered as a replacement for a human attendant who would otherwise be required to transcribe the message, or for a simple analog recording device (answering machine) that can be connected to a called telephone. In this regard see, for example, a book entitled "A Practical Guide to Voice Mail" by Martin F. Parker, Osborne McGraw-Hill, 1987 at pages 2-20 and 198-199; an article entitled "A Voice Message System" by D. Cohen in *Computer Message Systems*, edited by R. P. Uhlig, Proceeding of the IFIP TC-6 International Symposium On Computer Message Systems, Ottawa, Canada, 6-8 Apr. 1981, North Holland Publishing Co., at pages 17-28; an article entitled "An Experimental Voice-Message System Controlled By Word Recognition" by P. Mermelstein et al. in *Computer Message Systems*, edited by R. P. Uhlig, Proceeding of the IFIP TC-6 International Symposium On Computer Message Systems, Ottawa, Canada, 6-8 Apr. 1981, North Holland Publishing Co., at pages 29-34; and an article entitled "Voice Mail and Competing Services" by Dr. I. Gitman in *Computer Message Systems*, edited by R. P. Uhlig, Proceeding of the IFIP TC-6 International Symposium On Computer Message Systems, Washington, D.C., 5-7 Sep. 1985, North Holland Publishing Co., at pages 405-410. Limitations are found with certain VMSs when they are integrated with a Private Branch Exchange ("PBX") in a circumstance wherein a caller communicating with the VMS desires to transfer to an extension on the PBX.

Referring now to FIG. 1, there is shown a conventional system 9 comprising a Voice Messaging (or Voice Mail) System ("VMS") 10 which is integrated with (coupled to) a Private Branch Exchange ("PBX") 12 via an Integrated Voice Messaging System ("IVMS") link 14, a plurality of lines 16 comprised of Logic Terminal Numbers ("LTNs") in an Automatic Call Distribution ("ACD") Group, and a single operator extension line 18. For purposes of discussion, it is assumed that PBX 12 is a Northern Telecom SL-1 PBX. Integration of VMS 10 and PBX 12 is achieved through IVMS link 14 which passes phone call information from PBX 12 to VMS 10. The call information transferred over link 14 includes, for example, "Called Party Extension," "Calling Extension Party," and a "Reason for the Call." This call information is used by VMS 10 to provide intelligent service to a caller. In such an integrated system, the voice paths of the various callers to VMS 10 are provided from PBX 12 over lines 16 comprised of LTNs in the ACD Group.

IVMS link 14 also carries certain information from VMS 10 back to PBX 12. One use of the information passed back to PBX 12 is to have the PBX transfer a caller to a single operator extension line 18 (also called a Night Call ForWarding line or "NCFW" in a Northern Telecom SL-1 PBX). This capability is used by VMS 10 to achieve transfers to any extension on PBX 12. The following steps are used to transfer calls in the VMS/PBX integrated system of FIG. 1. In a first step, a caller engaged in a VMS session who wishes to transfer to an extension on PBX 12 enters the extension number to VMS 10. In a second step, VMS 10 notes the request for transfer and transmits a special command (e.g., an Operator (OPR) command) to PBX 12 over IVMS link 14. In a third step, PBX 12 recognizes the special command and transfers the caller to NCFW operator line 18 which then rings a call into VMS 10. In a fourth step, VMS 10 picks up the call on NCFW line 18. Since VMS 10 initiated and remembers which caller requested a transfer to a particular extension in the first step, VMS 10 performs a "Hook Flash" transfer to this extension over NCFW line 18. In a fifth and final step, when PBX 12 receives a "Hook Flash" transfer request from VMS 10 along with the extension number desired, PBX 12 rings the desired extension and connects the caller to this extension. As soon as this is accomplished, VMS 10 releases NCFW operator line 18 to handle a next transfer request.

System 9 of FIG. 1 suffers from the following limitations. First, it is difficult to accommodate a number of concurrent transfer requests which occur at a given time since only one NCFW operator line 18 is available. Due to such difficulty of accommodating concurrent transfer requests, certain VMSs restrict the transfers to only the operator or attendant. The time expended in transferring each call is objectionable to some VMS 10 users. Second, if VMS 10 is given the capability of transferring callers to any extension on PBX 12, then depending upon the number of callers desiring to transfer at the same time, some of the calls may have to wait for a long period of time in a queue before such callers finally get transferred. This occurs because a single NCFW operator line 18 can only perform one transfer at a time, and it can take up to ten seconds for each transfer. Therefore, if six callers are requesting transfers at the same time, one of the callers will have to wait up to 60 seconds before that caller can be serviced. Many VMS users object to this time delay.

SUMMARY OF THE INVENTION

The present invention is directed to apparatus and method for achieving multiple call transfers in a substantially simultaneous manner without a noticeable delay to callers who originate transfers in a Voice Mail System ("VMS") to extensions on a Private Branch Exchange ("PBX") which is integrated with the VMS. More particularly, the apparatus comprises a VMS comprising an applications processor, a PBX, an integration link, a plurality of first lines, and a plurality of second lines. The PBX comprises a plurality of input lines connected to separate subscribers thereof having different extension numbers. The integration link is used for bidirectionally transmitting call information between the VMS and the PBX. Each first line of the plurality of first lines is capable of carrying a voice transmission between a caller and the VMS via the PBX. The plurality of second lines are preferably formed into a hunt group associated with a predetermined pilot number associated with the PBX. More particularly, in response to a transfer command being received by the PBX from the VMS after the applications processor has determined that at least one of the second lines is free, in the preferred embodiment, the PBX directs the call to the predetermined pilot number of the second lines. In response to the predetermined pilot number being accessed at the PBX, a free line of the second lines hunt group is hunted and chosen for connecting the PBX to the applications processor of the VMS. The chosen second line is used by the VMS to effect transfer of the caller communicating with the VMS to a desired extension on the PBX. The chosen second line is then released for use in another transfer request if the transfer is determined to be successful by the VMS.

The method of transferring a caller communicating over a voice line with a VMS to an extension on a PBX which is integrated with (coupled to) the VMS comprises the following steps in accordance with a preferred embodiment of the present invention. In a first step, the VMS determines whether at least one of a plurality of analog lines in the second lines hunt group between the PBX and the VMS is free This first step is performed in response to the caller indicating a transfer request to a particular extension on the PBX. In a second step a transfer command is transmitted from the VMS to the PBX over an integrated link therebetween when at least one of the plurality of analog lines is determined as being free in the first step. When no analog line is determined as being free in the first step, the transfer request is placed in a queue. In a third step, a free analog line of the plurality of analog lines in the second lines hunt group is obtained by the PBX in response to the PBX receiving the transfer command in the second step. This obtained free analog line is used to connect the PBX to an applications processor of the VMX. In a fourth step, the applications processor communicates with the PBX over the analog line of the second lines group obtained by the PBX in the third step for effecting connection of the caller over the voice line to the extension of the PBX. In a fifth and final step, the analog line obtained in the third step is released when the caller is successfully connected to the particular extension on the PBX.

The invention will be better understood from the following more detailed description taken with the accompanying drawings and claims.

BRIEF DESCRIPTION OF THE DRAWINGS

Corresponding elements in each of the drawings have the same reference numbers.

DETAILED DESCRIPTION

Figure 1:
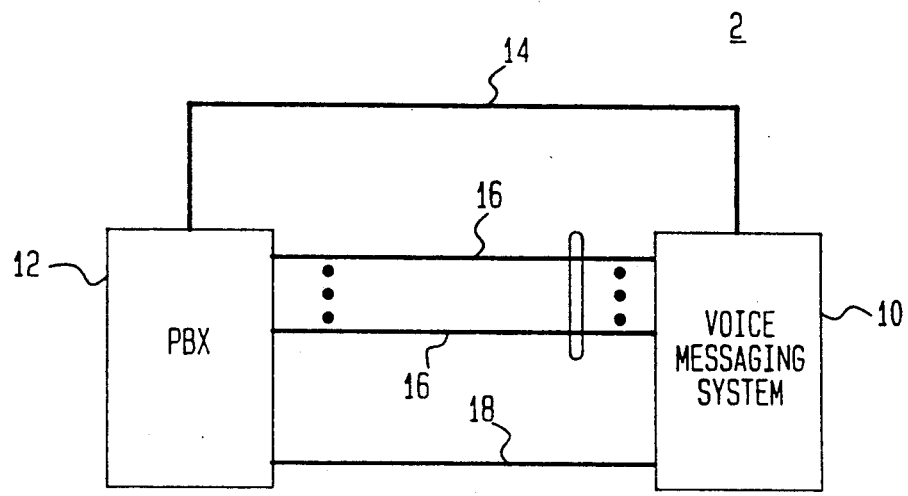
FIG. 1 shows a block diagram of a conventional (prior art) system showing a trunk configuration of a Voice Mail System which is integrated with (coupled to) a Private Branch Exchange.
Figure 2:
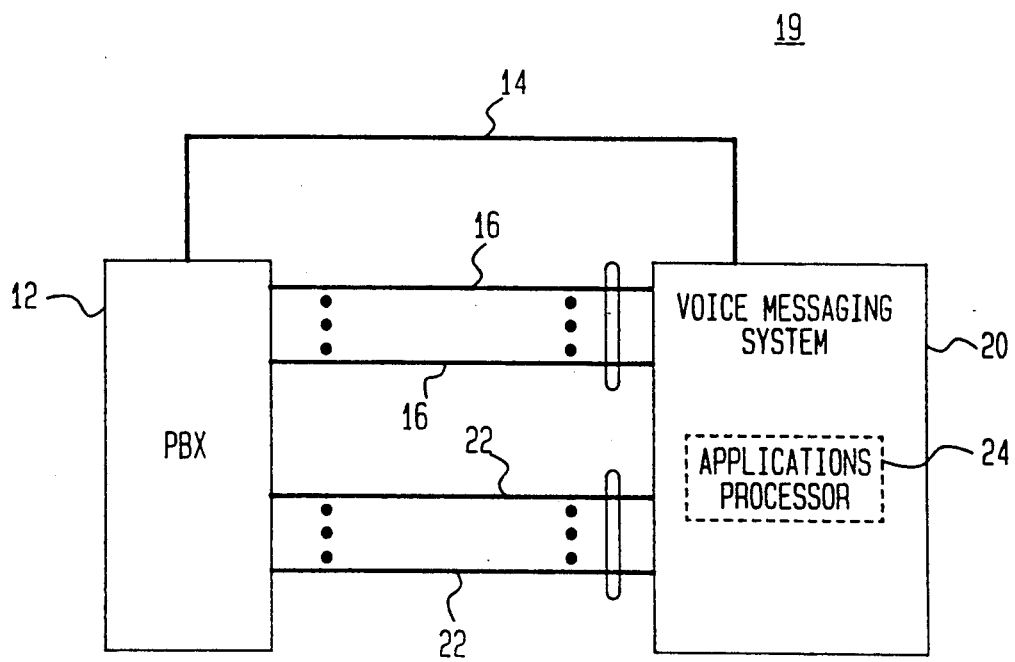
FIG. 2 shows a block diagram of a system comprising a Voice Mail System which is integrated with a Private Branch Exchange in accordance with the present invention.

Referring now to FIG. 2, there is shown a system 19 which is fabricated in accordance with the present invention. System 19 comprises a Voice Messaging (or Voice Mail) System ("VMS") 20 which is integrated with (coupled to) a Private Branch Exchange ("PBX") 12 via an Integrated Voice Messaging System ("IVMS") link 14, a plurality of lines 16 comprising Logical Terminal Numbers ("LTNs") in an Automatic Call Distribution ("ACD") Group, and a plurality of analog lines 22 formed in a hunt group in accordance with the present invention. VMS 20 comprises an applications processor 24 (shown within a dashed line rectangle). For purposes of discussion hereinafter, it is assumed that PBX 12 is a Northern Telecom SL-1 PBX. The integration (coupling) between VMS 20 and PBX 12 is achieved through IVMS link 14 which passes phone call information as, for example, "Called Party Extension," "Calling Party Extension," and a "Reason for the Call," from PBX 12 to VMS 20. This call information is received by applications processor 24 and is used by VMS 20 to provide intelligent service to a caller. In system 19 of FIG. 2, the voice path to VMS 20 is provided from PBX 12 over lines 16 of Logical Terminal Number ("LTN") in an Automatic Call Distribution ("ACD") Group. It is to be understood that applications processor 24 of VMS 20 is a well known element that comprises, for example, a computer or microcomputer coupled to peripheral devices such as memory means that stores (a) appropriate application programs for performing defined tasks, and (2) fixed and temporary type data.

IVMS link 14 also carries certain information from VMS 20 back to PBX 12. One use of IVMS link 14 is to pass a special command to PBX 12 in order to cause PBX 12 to transfer a caller on VMS 20 to one of the plurality of analog lines 22 formed in a hunt group. For example, a predetermined pilot number in a Northern Telecom SL-1 PBX accesses a Night Call ForWarding line (NCFW) number which, in turn, accesses the plurality of lines 22. This capability is used by VMS 20 to achieve transfers to any extension on PBX 12. More particularly, in response to VMS 20 transmitting a special command [e.g., an Operator (OPR) command] to PBX 12 over IVMS link 14, PBX 12 transfers the caller to the NCFW operator pilot number. This causes the plurality of analog lines 22 to be hunted for a free line. Once a free line 22 is found, that line is used to ring a call into VMS 20. Since VMS 20 initiated and remembers that the caller has made a request to transfer to a particular extension in the first step, VMS 20 causes PBX 12 to ring the desired extension and connect the caller to this extension. As soon as this is accomplished successfully, analog line 22 becomes free to handle a next transfer request.

Figure 3:
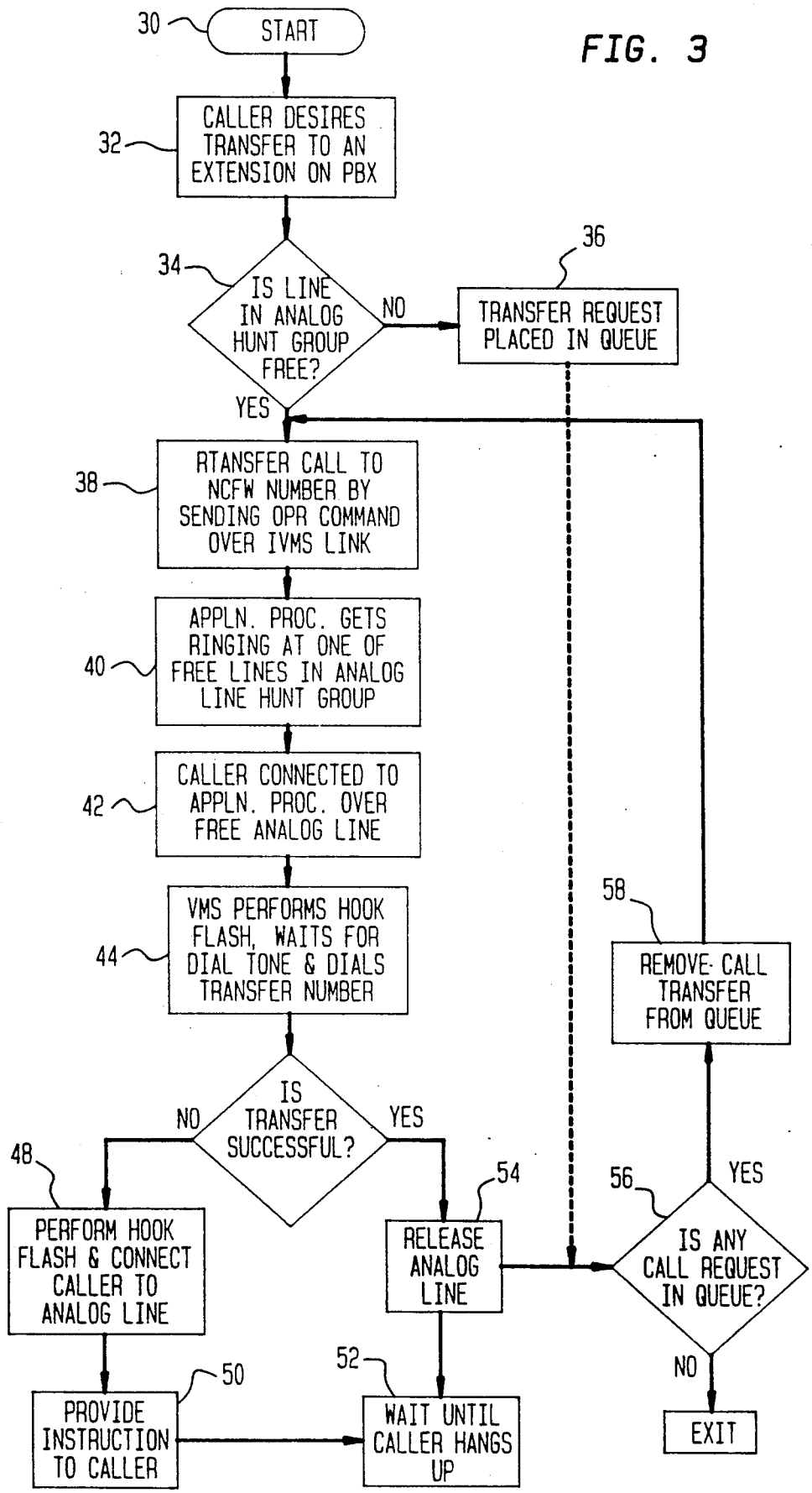
FIG. 3 shows a flow diagram of the steps in transferring a call by a caller in a Voice Mail system session who wishes to transfer to a extension on the Private Branch Exchange in the system of FIG. 2 in accordance with the present invention.

Referring now to FIG. 3, there is shown a flow diagram of steps for transferring a call by a caller in a VMS 20 session who wishes to transfer to an extension on PBX 12 in system 19 of FIG. 2 in accordance with the present invention. In a first step shown in block 32, after a "start" block 30, the caller determines that a transfer to an extension on PBX 12 is desired. As stated for the transfer process for system 19 of FIG. 2, the caller enters the desired extension number to VMS 20. VMS 20 notes the request for a transfer. VMS 20 keeps track of the number of analog lines 22 that are being used and determines therefrom if one of the analog lines 22 is free (unused)—as is shown in decision diamond 34. If there is no free analog line 22 (a No decision from the decision diamond 34), VMS 20 places the call in a queue as is shown in block 36. This queued transfer request waits until an analog line 22 in the hunt group becomes available. If VMS 20 determines that at least one analog line 22 is free (a Yes decision from the decision diamond 34), VMS 20 transmits a special command [e.g., an Operator (OPR) command] to PBX 12 over IVMS link 14 as is shown in block 38. As is shown in block 38, PBX 12 transfers the call to the NCFW pilot number in response to the special OPR command.

Applications processor 24 in VMS 20 receives a ringing call over the free analog line 22 as is shown in block 40. It is to be understood that the analog line 22 on which the call arrives at applications processor 24 cannot always be determined beforehand since the first available analog line 22 during a hunt for a free analog line at PBX 12 is chosen at any instance of time. The caller then is connected to applications processor 24 over one of the free analog lines 22 as is shown in block 42. Since an analog 22 is always free when the special OPR command is sent by VMS 20, the caller always gets re-connected to VMS 20 via a free analog line 22 as is shown in block 42. The process of sending an OPR command (block 38) and obtaining ringing at applications processor 24 (block 40) is typically completed within a fraction of a second.

After the caller is connected to applications processor 24 in block 42, VMS 20 performs a "hook flash" over the analog line 22, waits for dial tone, and dials the extension number to which the caller desires to be connected as is shown in block 44. If the transfer is successful (a "Yes" decision from decision diamond 46), applications processor 24 releases the analog line 22 as is shown in block 54. At this time, VMS 20 determines if there is a pending queued request for transfer as is shown in decision diamond 56. If there is a queued transfer request (a Yes decision from the decision diamond 56), the transfer request is removed from the queue as is shown in block 58 and forwarded for action to block 38. If there is no queued transfer request (a No decision from the decision diamond 56), the process is exited as is shown in block 60. It is to be understood that the block 36 and the decision diamond 56 are not necessarily carried out in that order. Rather, the process of interrogating the queue is performed asynchronously. For this reason, the connecting lines between block 36 and the decision diamond 56 are shown as dashed lines.

If the transfer is not successful (a "No" decision from decision diamond 46), applications processor 24 performs a "hook flash" and connects the caller to VMS 20 over the analog line 22 as is shown in block 48. Applications processor 24 then provides instructions regarding the unsuccessful transfer to the caller as is shown in block 50 and waits for the caller to hang up (as is shown in block 52) before releasing the analog line 22 (as is shown in block 54).

In the system where VMS 20 is integrated with PBX 12, the more analog lines 22 that are included in the hunt group, the more substantially simultaneous transfers can be accomplished. Therefore, depending on the transfer requirements, a system designer can choose the appropriate number of analog lines 22 in the hunt group to serve the purpose. It should be noted that when the OPR command is sent over IVMS link 14 (as is shown in block 38), it is not always possible to predict the analog line 22 which is chosen by PBX 12 on which a ringing call will arrive to applications processor 24 for a particular transfer. For this reason, it is impractical to initiate more than one transfer at exactly the same time because of the possibility of mixing up callers with different intended destinations. Since a ringing call arrives at applications processor 24 very quickly (typically within a fraction of a second) after the OPR command is sent over IVMS link 14, system 19 is quickly ready to receive the next transfer call on another analog line 22 in the hunt group. As a result, the delay introduced is essentially not noticeable to human users, and the callers get the perception that the system 19 is handling simultaneous transfers, although technically these transfers are not performed in a strictly simultaneous manner.

It is to be appreciated and understood that the specific embodiments of the invention described hereinbefore are merely illustrative of the general principles of the invention. Various modifications may be made by those skilled in the art consistent with the principles set forth hereinbefore. For example, the method can be used on any other integrated PBX that uses a similar technique as described hereinbefore for use with the Northern Telecom SL-1 PBX 12. Further, the VMS system can also be an analogous type of system which stores and forwards facsimile ("FAX"), text, and other types of messages. Still further, the group of lines in the hunt group are not restricted to analog lines and may, in fact, comprise digital lines. Yet still further, the group of lines which are used in the transfer need not be arranged in a hunt group and, in fact, the PBX may comprise an applications program which scans for a free line among a predetermined number of lines.

What is claimed is:

1. A method of transferring a caller communicating over one of a plurality of first lines with a Voice Mail System which is integrated with a Private Branch Exchange to an extension on a Private Branch Exchange comprising the steps of:
   (a) determining in the Voice Mail System whether at least one a plurality of second lines in a hunt group between the Private Branch Exchange and the Voice Mail System is free in response to the caller indicating a transfer request to the Voice Mail System for a particular extension on the Private Branch Exchange, where the plurality of second lines in the hunt group are associated with a predetermined pilot number of the Private Branch Exchange;
   (b) transmitting a transfer command from the Voice Mail System to the Private Branch Exchange over a link therebetween when at least one of the plurality of second lines in the hunt group is determined in the Voice Mail System as being free in step (a), and queueing the transfer request when none of the plurality of second lines in the hunt group is determined as being free in step (a);
   (c) accessing the predetermined pilot number of the Private Branch Exchange associated with the plurality of second lines in the hunt group by the Private Branch Exchange in response to the Private Branch Exchange receiving the transfer command over the link in step (b);

(d) obtaining a free one of the plurality of second lines in the hunt group by the Private Branch Exchange in response to the accessing of the predetermined pilot number in step (c) for connecting the Private Branch Exchange to an applications processor the Voice Mail System over the obtained free second line in the hunt group;

(e) the applications processor communicating with the Private Branch Exchange over the second line in the hunt group obtained by the Private Branch Exchange in step (d) for effecting connection of the caller to the extension of the Private Branch Exchange; and (f) releasing the second line in the hunt group obtained in step (d) when the caller is successfully connected to the particular extension on the Private Branch Exchange.

2. The method of claim 1 wherein in performing step (d), the Private Branch Exchange performing the substeps of:

(d1) searching through the plurality of second lines in the hunt group to obtain a free second line; and (d2) connecting the Private Branch Exchange to the applications processor of the Voice Mail System using the free second line found in step (d1).

3. The method of claim 1 wherein after performing step (f), the applications processor causes the subsequent performing of steps (b) to (f) for effecting a queued transfer call to be completed to the particular extension on the Private Branch Exchange.

4. The method of claim 1 wherein in performing step (e), performing the substeps of:

(e1) associating a call transfer request to a second line in the hunt group by the applications processor when the applications processor is connected to the Private Branch Exchange over the second line in the hunt group;

(e2) performing a hook flash by the applications processor over the second line in the hunt group, and then waiting for a dial tone from the Private Branch Exchange over the second line in the hunt group; and (e3) dialing the telephone number of the extension on the Private Branch Exchange by the applications processor over the second line in the hunt group in response to the receipt of the dial tone on the second line of the hunt group.

5. A method of transferring a caller communicating over one of a plurality of first lines with a Voice Mail System which is integrated with a Private Branch Exchange to an extension on a Private Branch Exchange comprising the steps of:

(a) receiving at the Voice Mail System over the one of the plurality of first lines a request for transfer to a particular extension on the Private Branch Exchange from the caller;

(b) determining in the Voice Mail System whether at least one a plurality of second lines in a hunt group between the Private Branch Exchange and the Voice Mail System is free in response to the receipt of the request for transfer in step (a);

(c) transmitting a transfer command from the Voice Mail System to the Private Branch Exchange over a link therebetween in response to at least one of the plurality of second lines in the hunt group being determined in the Voice Mail System as being free in step (b), and queueing the transfer request when no second line is determined as being free in step (b);

(d) accessing a predetermined pilot number of the Private Branch Exchange associated with the plurality of second lines in the hunt group in response to the receipt of the transfer command over the link in step (c);

(e) searching through the plurality of second lines in the hunt group by the Private Branch Exchange in response to the Private Branch Exchange receiving the transfer command in step (c) to obtain a free second line;

(f) connecting the Private Branch Exchange to an applications processor of the Voice Mail System using the free second line found in step (e);

(g) the applications processor communicating with the Private Branch Exchange over the obtained second line of the predetermined hunt group obtained by the Private Branch Exchange in step (e) for effecting connection of the caller at the Private Branch Exchange to the extension of the Private Branch Exchange; and (h) releasing the second line obtained in step (e) when the caller is successfully connected to the particular extension on the Private Branch Exchange.

6. The method of claim 5 wherein after performing step (h), the applications processor asynchronously causes the subsequent performing of steps (c) to (h) for effecting a queued transfer call to be completed to the particular extension on the Private Branch Exchange.

7. The method of claim 5 wherein in performing step (g) performing the substeps of:

(g1) associating a call transfer request to the second line in the hunt group by the applications processor when the applications processor is connected to the Private Branch Exchange over the second line in the hunt group;

(g2) performing a hook flash by the applications processor over the second line in the hunt group, and then waiting for a dial tone from the Private Branch Exchange over the second line; and (g3) dialing the telephone number of the extension on the Private Branch Exchange by the applications processor over the second line in the hunt group in response to the receipt of the dial tone on the second line.

8. Apparatus comprising:

a Voice Mail System comprising an applications processor;

a Private Branch Exchange comprising a plurality of input lines connected to separate subscribers and having different extension numbers;

an integration link for transmitting information between the Voice Mail System and the Private Branch Exchange;

a plurality of first lines, each first line being capable of carrying voice transmissions between a caller and the Voice Mail System via the Private Branch Exchange; and a plurality of second lines in a hunt group associated with a predetermined pilot number wherein a free second line is chosen at the Private Branch Exchange for connecting the Private Branch Exchange to the applications processor of the Voice Mail System in response to a command being received by the Private Branch Exchange from the Voice Mail System after the Voice Mail System has determined that at least one second line is free, for effecting a transfer of a caller communicating with the Voice Mail System to an extension on the Private Branch Exchange by the applications processor.

9. The apparatus of claim 8 wherein the applications processor in the Voice Mail System determines if a second line is free in response to the receipt of a request for transfer by the caller to an extension on the Private Branch Exchange, and transmits the command over the integration link to the Private Branch Exchange when at least one second line is determined as being free, and places the transfer request in a queue when no second line is determined as being free.

10. The apparatus of claim 9 wherein the Private Branch exchange includes means for accessing the predetermined pilot number of the plurality of second lines in the hunt group in response to receipt of the command over the integration link from the Voice Mail System for causing a hunt for a free second line in the hunt group.

11. The apparatus of claim 8 wherein the applications processor comprises means for releasing the second line used for effecting a call transfer once the caller requesting the call transfer is successfully connected to the requested extension on the Private Branch Exchange.

* * * * *